US009904131B1

(12) United States Patent
Xie

(10) Patent No.: US 9,904,131 B1
(45) Date of Patent: Feb. 27, 2018

(54) LIQUID CRYSTAL PANEL AND LIQUID CRYSTAL DEVICE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 326 days.

(21) Appl. No.: 14/898,819

(22) PCT Filed: Dec. 3, 2015

(86) PCT No.: PCT/CN2015/096264
§ 371 (c)(1),
(2) Date: Dec. 16, 2015

(87) PCT Pub. No.: WO2017/088202
PCT Pub. Date: Jun. 1, 2007

(30) Foreign Application Priority Data

Nov. 27, 2015 (CN) .......................... 2015 1 0853383

(51) Int. Cl.
*G02F 1/1335* (2006.01)
*G02F 1/136* (2006.01)
*G02F 1/1343* (2006.01)

(52) U.S. Cl.
CPC ............ *G02F 1/136* (2013.01); *G02F 1/1343* (2013.01); *G02F 1/133528* (2013.01); *G02F 1/133553* (2013.01); *G02F 1/133605* (2013.01)

(58) Field of Classification Search
CPC ......... G02F 1/133555; G02F 1/133514; G02F 1/133553; G02F 1/133707;
(Continued)

(56) References Cited

U.S. PATENT DOCUMENTS 6,850,298 B2 * 2/2005 Fujimori ........... G02F 1/133371
349/107
2005/0117097 A1 * 6/2005 Noguchi ........... G02F 1/133555
349/114
(Continued)

FOREIGN PATENT DOCUMENTS

CN 103018949 A 4/2013
JP 2004317908 A 11/2004
JP 2005275044 A 10/2005

*Primary Examiner* — Huyen Ngo
(74) *Attorney, Agent, or Firm* — Andrew C. Cheng

(57) ABSTRACT

A liquid crystal panel and a LCD are disclosed. The liquid crystal panel includes a first substrate and a second substrate parallel to each other, and a liquid crystal layer between the first substrate and the second substrate, wherein the first substrate comprises at least one reflective area and at least one transmission area arranged in an interleaved manner. A surface of the first substrate facing away the second substrate is configured with a metallic reflective layer of a wedged-shaped structure, the metallic reflective layer is arranged on the reflective area. A surface of the metallic reflective layer facing toward the liquid crystal layer is a plane, and a surface of the metallic reflective layer facing away the liquid crystal layer is a slope. A thickness of the metallic reflective layer has been gradually increased along a direction from the transmission area toward the reflective area.

14 Claims, 2 Drawing Sheets

(58) Field of Classification Search
CPC ......... G02F 1/136227; G02F 1/133371; G02F 1/133504; G02F 1/133512; G02F 1/1393; G02F 1/133753; G02F 1/134363; G02F 1/1368; G02F 1/133345
See application file for complete search history.

(56) References Cited

U.S. PATENT DOCUMENTS

| | | | |
|---|---|---|---|
| 2005/0122452 A1* | 6/2005 | Yoshida | G02F 1/133555 349/114 |
| 2012/0287380 A1* | 11/2012 | Hagiwara | G02B 5/201 349/97 |
| 2017/0102584 A1 | 4/2017 | Xie | |

* cited by examiner

LIQUID CRYSTAL PANEL AND LIQUID CRYSTAL DEVICE

BACKGROUND OF THE INVENTION

1. Field of the Invention

The present disclosure relates to liquid crystal display technology, and more particularly to a liquid crystal panel and a liquid crystal device (LCD).

2. Discussion of the Related Art

LCD panels generally include a color film substrate and an array substrate opposite to the color film substrate, and wherein a liquid crystal layer is encapsulated within the space encapsulated between the two substrates. As the liquid crystal molecules do not emit lights themselves, a light source is needed for the display panel to display images. The LCDs may include transmission, reflective, and transflective LCDs.

The transmission liquid crystal panel mainly adopt the backlight source as the light source, wherein the backlight source is arranged behind the liquid crystal panel. The pixel electrode on the array substrate may be the transparent electrode operating as a transmission area, for which the light beams of the backlight source may pass through the liquid crystal layer so as to display the images. With respect to the transmission liquid crystal panels, the light beams passing through the liquid crystal panel are only a small portion of the light beams emitting by the backlight source, that is, the utilization rate of the backlight source is not high. In order to enhance the brightness of the backlight source, the power consumption of the backlight source may be greatly increased.

Regarding the reflective liquid crystal panel, usually, a front light source or an external light source is adopted. The array substrate may adopt the reflective electrodes, which are made by materials such as metal or other materials having good reflective characteristics, as the transmission area, so as to reflect the light beams from the front light source or the external light source. However, the reflective liquid crystal panels reply on the external light source and thus are not capable of displaying the images in dark states.

The transflective liquid crystal panels may be viewed as combination of the transmission and the reflective panels. On the array substrates, not only the reflective area, but also the transmission area are configured thereon. At the same time, the backlight source and the front source may be adopted at the same time. As such, the transflective liquid crystal panels may display bright images in a dark environment, such as indoor, and also may be adopted in portable electronic devices, such as cellular phones, digital cameras, palms and so on, so as to operate in outdoor. However, the light beams emitted by the backlight source are toward the transmission area and the reflective area. Although the light beams toward the transmission area may be effectively utilized, but the light beams toward the reflective area are totally blocked.

SUMMARY

The object of the invention is to provide a liquid crystal panel and a liquid crystal device (LCD) for enhancing the utilization rate and optical efficiency of the backlight source so as to reduce the power consumption of the display panel.

In one aspect, a liquid crystal panel includes: a TFT substrate and a color film substrate parallel to each other, and a liquid crystal layer between the TFT substrate and the color film substrate, wherein the TFT substrate includes at least one reflective area and at least one transmission area arranged in an interleaved manner, a surface of the TFT substrate facing away the color film substrate is configured with a metallic reflective layer of a wedged-shaped structure, the metallic reflective layer is arranged on the reflective area, a surface of the metallic reflective layer facing toward the liquid crystal layer is a plane, and a surface of the metallic reflective layer facing away the liquid crystal layer is a slope, a thickness of the metallic reflective layer has been gradually increased along a direction from the transmission area toward the reflective area, the liquid crystal panel further includes a first polarizer and a second polarizer, the first polarizer arranged on the surface of the TFT substrate facing away the color film substrate, and the second polarizer is arranged on the surface of the color film substrate facing away the TFT substrate.

Wherein the first polarizer includes a hollow area, and location of the hollow area corresponds to the reflective area.

Wherein the first polarizer is a TFT polarizer, and the second polarizer is a color film polarizer.

Wherein the liquid crystal panel further includes a common electrode and a pixel electrode, the common electrode is arranged between the liquid crystal layer and the color film substrate, and the pixel electrode is arranged between the liquid crystal layer and the TFT substrate.

In another aspect, a liquid crystal panel includes: a first substrate and a second substrate parallel to each other, and a liquid crystal layer between the first substrate and the second substrate, wherein the first substrate includes at least one reflective area and at least one transmission area arranged in an interleaved manner, a surface of the first substrate facing away the second substrate is configured with a metallic reflective layer of a wedged-shaped structure, the metallic reflective layer is arranged on the reflective area, a surface of the metallic reflective layer facing toward the liquid crystal layer is a plane, and a surface of the metallic reflective layer facing away the liquid crystal layer is a slope, and a thickness of the metallic reflective layer has been gradually increased along a direction from the transmission area toward the reflective area.

Wherein the liquid crystal panel further includes a first polarizer and a second polarizer, the first polarizer arranged on the surface of the first substrate facing away the second substrate, and the second polarizer is arranged on the surface of the second substrate facing away the first substrate.

Wherein the first polarizer includes a hollow area, and location of the hollow area corresponds to the reflective area.

Wherein the first polarizer is a TFT polarizer, and the second polarizer is a color film polarizer.

Wherein the first substrate is a TFT substrate, and a second substrate is a color film substrate.

Wherein the liquid crystal panel further includes a common electrode and a pixel electrode, the common electrode is arranged between the liquid crystal layer and the color film substrate, and the pixel electrode is arranged between the liquid crystal layer and the TFT substrate.

In another aspect, a liquid crystal device (LCD) includes: a backlight module comprising a backlight source and a reflective film; and a liquid crystal panel includes a first substrate and a second substrate parallel to each other, and a liquid crystal layer between the first substrate and the second substrate, wherein the first substrate includes at least one reflective area and at least one transmission area arranged in an interleaved manner, a surface of the first substrate facing away the second substrate is configured with a metallic reflective layer of a wedged-shaped structure, the metallic reflective layer is arranged on the reflective area, a surface of the metallic reflective layer facing toward the liquid crystal layer is a plane, and a surface of the metallic reflective layer facing away the liquid crystal layer is a slope, and a thickness of the metallic reflective layer has been gradually increased along a direction from the transmission area toward the reflective area.

Wherein the metallic reflective layer reflects first light beams and second light beams, wherein the first light beams are generated by the light beams emitted from the backlight source and the reflective film, entering the slope of the metallic reflective layer, and reflected by the slope, and the first light beams are reflected by the reflective film and then emit out from the transmission areas, the second light beams are generated by ambient lights entering the plane of the metallic reflective layer via the second substrate and the liquid crystal layer and then are reflected by the slope.

Wherein the liquid crystal panel further includes a first polarizer and a second polarizer, the first polarizer arranged on the surface of the first substrate facing away the second substrate, and the second polarizer is arranged on the surface of the second substrate facing away the first substrate.

Wherein the first polarizer includes a hollow area, and location of the hollow area corresponds to the reflective area, the light beams emitted from the backlight source and the reflective film pass through the hollow area, and the first light beams reflected by the metallic reflective layer pass through the hollow area.

In view of the above, the liquid crystal panel includes a first substrate and a second substrate parallel to each other, and a liquid crystal layer between the first substrate and the second substrate, wherein the first substrate comprises at least one reflective area and at least one transmission area arranged in an interleaved manner. A surface of the first substrate facing away the second substrate is configured with a metallic reflective layer of a wedged-shaped structure, the metallic reflective layer is arranged on the reflective area. A surface of the metallic reflective layer facing toward the liquid crystal layer is a plane, and a surface of the metallic reflective layer facing away the liquid crystal layer is a slope. A thickness of the metallic reflective layer has been gradually increased along a direction from the transmission area toward the reflective area. In this way, the light beams toward the reflective area may be reflected by the metallic reflective layer so as to be utilized again. This enhances the utilization rate and the optical efficiency of the light source so as to reduce the power consumption of the liquid crystal panel.

DETAILED DESCRIPTION OF THE EMBODIMENTS

Embodiments of the invention will now be described more fully hereinafter with reference to the accompanying drawings, in which embodiments of the invention are shown.

Figure 1:
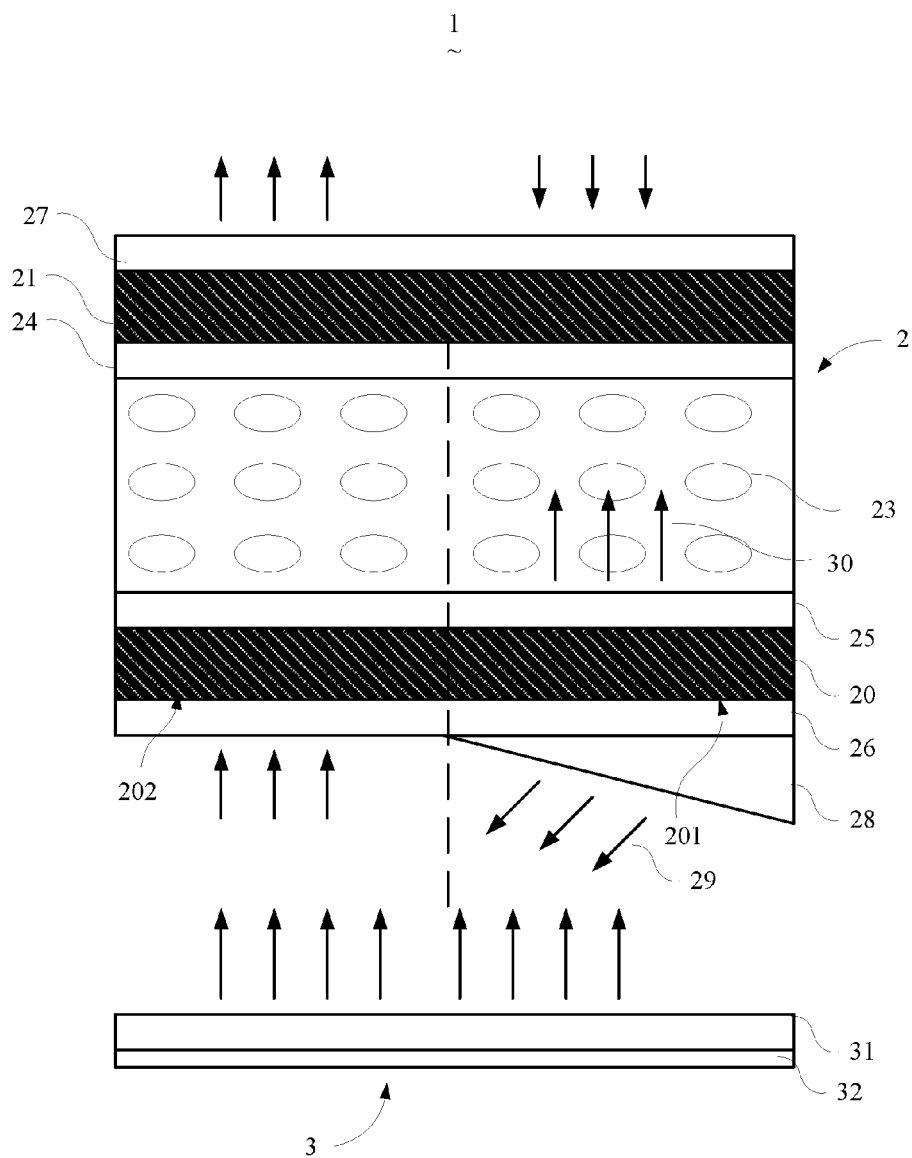
FIG. 1 is a schematic view of the LCD in accordance with a first embodiment.

FIG. 1 is a schematic view of the LCD in accordance with a first embodiment. As shown in FIG. 1, the LCD 1 includes a liquid crystal panel 2 and a backlight module 3. The liquid crystal panel 2 and the backlight module 3 are overlapped and assembled to be a main body. The liquid crystal panel 2 may be, but not limited to, Thin Film Transistor-Liquid Crystal Display (TFT-LCD). The liquid crystal panel 2 includes a first substrate 20, a second substrate 21, and a liquid crystal layer 23 between the first substrate 20 and the second substrate 21. In addition, the liquid crystal panel 2 may include a common electrode 24, a pixel electrode 25, a first polarizer 26, a second polarizer 27, and a metallic reflective layer 28. The pixel electrode 25 is arranged between the first substrate 20 and the liquid crystal layer 23. The common electrode 24 is arranged between the second substrate 21 and the liquid crystal layer 23. The first polarizer 26 is arranged on a first surface of the first substrate 20. The first surface is one surface of the first substrate 20 far away from the second substrate 21. The second polarizer 27 is arranged on a surface of the second substrate 21 far away from the first substrate 20. The first substrate 20 may be a TFT substrate, and the second substrate 21 may be a color film substrate. In addition, a color film (not shown) is arranged between the second substrate 21 and the common electrode 24. The first polarizer 26 may be a TFT polarizer, and the second polarizer 27 may a color film polarizer. The metallic reflective layer 28 is arranged on the surface of the first substrate 20 far away from the second substrate 21. Preferably, the metallic reflective layer 28 is arranged on the surface of the first polarizer 26 far away from the first substrate 20.

The backlight module 3 includes a backlight source 31 and a reflective film 32. The reflective film 32 is arranged within the backlight source 31 for reflecting the light beams emitted from the backlight source 31. In addition, the reflective film 32 prevents the light source from leakage, which increases the optical efficiency. The backlight source 31 includes, but not limited to, Light Emitting Diode (LED), or Electroluminescence (EL), for supplying the light source to the liquid crystal panel 2. In addition, the backlight module 3 may include a light guiding plate, optical films, plastic frames, and so on (not shown).

In the embodiment, the first substrate 20 includes reflective areas 201 and transmission areas 202 that are arranged in an interleaved manner. Correspondingly, the first polarizer 26, the pixel electrode 25, the liquid crystal layer 23, the common electrode 24, and the second substrate 21 respectively corresponds to a first area and a second area of the reflective areas 201 and the transmission area 202. The same liquid crystal materials are adopted in the first area of the liquid crystal layer 23, which corresponds to the reflective areas 201, and the second area of the liquid crystal layer 23, which corresponds to the transmission area 202. The pixel electrode 25 includes a first electrode corresponding to the reflective area 201 and a second electrode corresponding to the transmission area 202. The first electrode drives the liquid crystals within the first area, and the second electrode drives the liquid crystals within the second area. The first polarizer 26 is arranged on the first surface of the first substrate 20. The metallic reflective layer 28 is arranged on the first polarizer 26. Preferably, one side of the first polarizer 26 on the first substrate 20 corresponding to the reflective area 201 is coated with the metallic reflective layer 28, and another side of the first polarizer 26 on the first substrate 20 corresponding to the reflective area 201 is not coated with the metallic reflective layer 28. The metallic reflective layer 28 may be made by metallic materials such as aluminum or silver. Wherein, the metallic reflective layer 28 is wedge-shaped. A surface of the metallic reflective layer 28 facing toward the liquid crystal layer 23 is a plane, and a surface of the metallic reflective layer 28 facing away the liquid crystal layer 23 is a slope. In addition, the thickness of the metallic reflective layer 28 has been gradually increased along a direction from the transmission area 202 toward the reflective area 201.

Both sides of the metallic reflective layer 28 may reflect the light beams. In the embodiment, the metallic reflective layer 28 reflects first light beams 29 and second light beams 30. The first light beams 29 are the light beams emitting from the backlight source 31 and the reflective film 32, entering the slope of the metallic reflective layer 28, and being reflected by the slope. The second light beams 30 are the ambient light beams passing through the second substrate 21 and the liquid crystal layer 23, entering the plane of the metallic reflective layer 28, and being reflected by the plane. The first light beams 29 are reflected by the metallic reflective layer 28 toward the backlight module 3 such that the light beams emitted from the backlight source 31 toward the reflective area 201 may be utilized again, which enhances the utilization rate of the backlight source. In addition, the metallic reflective layer 28 may reflect the second light beams 30 such that the second light beams 30 may emit out from the reflective area 201. As such, the reflective area 201 may display the images normally. As the metallic reflective layer 28 is wedge-shaped, the thickness of the metallic reflective layer 28 is gradually increased along a direction from the transmission area 202 toward the reflective area 201. That is, the metallic reflective layer 28 is shown as the slope structure, and the metallic reflective layer 28 inclines toward the transmission area 202. Thus, the light beams emitted from the backlight source 31 and the reflective film 32 toward the reflective area 201 are reflected by the metallic reflective layer 28. Afterward, the first light beams 29 are reflected toward the backlight module 3, and are reflected toward the transmission area 202 via the reflective film 32 of the backlight module 3. In the end, the first light beams 29 may emit out from the transmission area 202. In this way, the light beams emitted from the backlight source 31 may be utilized twice, and the utilization rate and the optical efficiency of the backlight source may be enhanced, which may reduce the power consumption of the LCD 1.

Thus, by arranging the wedge-shaped metallic reflective layer 28 on one side of the first substrate 20 corresponding to the reflective area 201, both of the surfaces of the metallic reflective layer 28 may reflect the light beams. In addition, the surface of the metallic reflective layer 28 facing toward the liquid crystal layer 23 is the plane, and the surface of the metallic reflective layer 28 facing away the liquid crystal layer 23 is the slope. The thickness of the metallic reflective layer 28 has been gradually increased along the direction from the transmission area 202 toward the reflective area 201. In this way, the ambient light beams entering the metallic reflective layer 28 via the second substrate 21 and the liquid crystal layer 23 emit out from the reflective area 201 after being reflected by the metallic reflective layer 28, which ensures the reflective area 201 may display the images normally. In addition, the light beams from the backlight source 31 are reflected toward the backlight module 3 by the metallic reflective layer 28 such that the light beams from the backlight source 31 may be utilized again. Further, as the metallic reflective layer 28 is wedge-shaped, it can be seen that the metallic reflective layer 28 inclines toward the transmission area 202. Thus, the light beams emitted from the backlight source 31 are reflected toward the area of the backlight module 3 corresponding to the transmission area 202. Afterward, the light beams emit out after being reflected by the reflective film 32. In this way, the light beams emitted from the backlight source 31 may be utilized twice, and the utilization rate and the optical efficiency of the backlight source may be enhanced, which may reduce the power consumption of the LCD 1.

Figure 2:
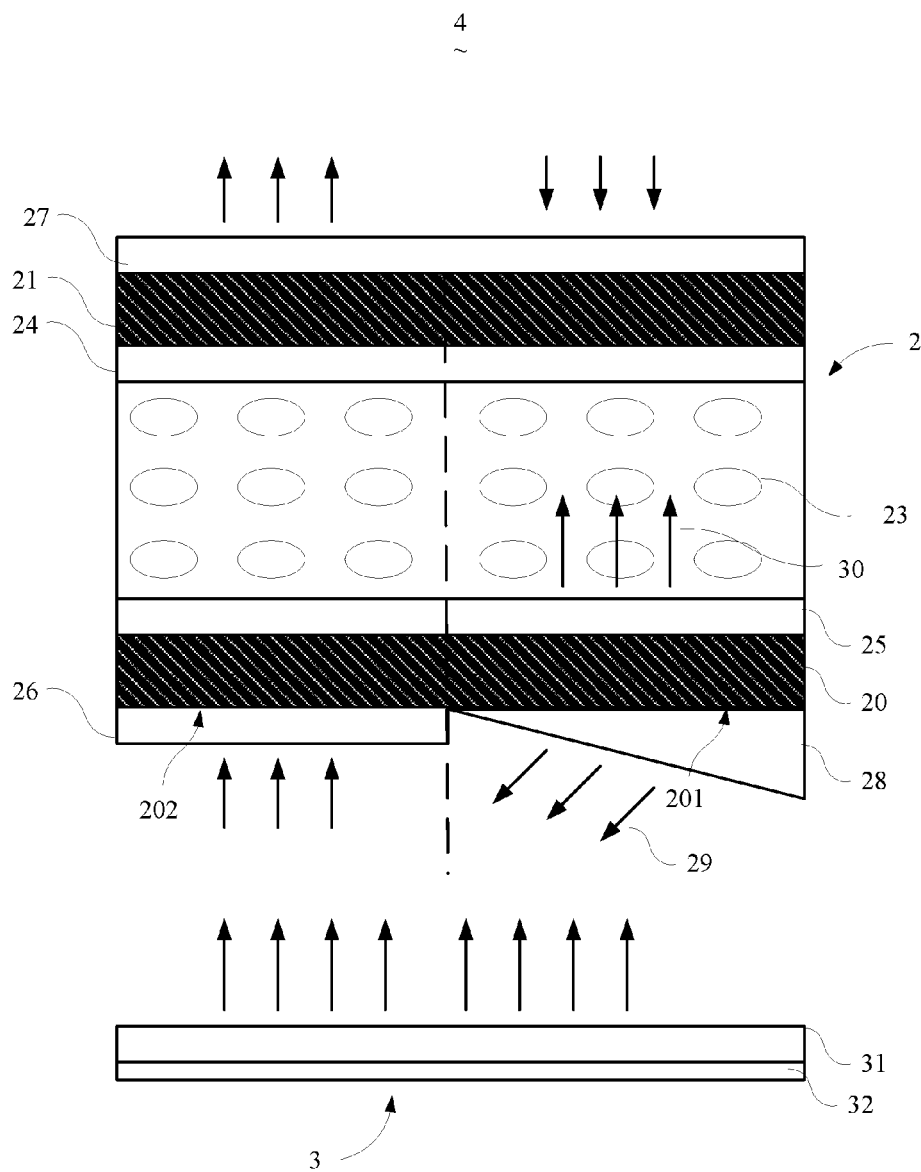
FIG. 2 is a schematic view of the LCD in accordance with a second embodiment.

FIG. 2 is a schematic view of the LCD in accordance with a second embodiment. The difference between the first embodiment and the second embodiment resides in that the first polarizer 26 includes a hollow area arranged corresponding to the reflective area 201. The metallic reflective layer 28 is directly arranged on the surface of the second light beams 30 far away from the second substrate 21 such that the light beams from the backlight source 31 and the reflective film 32 and the first light beams 29 reflected by the metallic reflective layer 28 may pass through the hollow area. The light beams, which are, emitted from the backlight source 31 and the reflective film 32 toward the reflective area 201, are reflected toward the backlight module 3 via the first light beams 29. Afterward, the light beams are reflected by the reflective film 32 such that the light beams may be utilized again, which enhances the light utilization rate. In addition, as the metallic reflective layer 28 is wedge-shaped, the first light beams 29 reflected back by the metallic reflective layer 28 may be reflected toward the transmission area 202 by the reflective film 32, and then emit out from the transmission area 202. As such, the light beams of the backlight source 31 may be utilized twice. In this way, the utilization rate and the optical efficiency of the light source may be enhanced, which reduces the power consumption of the display device. The ambient light may enter the metallic reflective layer 28 via the second substrate 21 and the liquid crystal layer 23, be reflected by the metallic reflective layer 28, and emit out from the reflective area 201. This configuration ensures the normal display of the reflective area 201.

In one aspect, a liquid crystal panel includes the liquid crystal panel in the first and the second embodiment.

In view of the above, the LCD includes the backlight module and the liquid crystal panel having the first substrate, the second substrate, and the liquid crystal layer between the first substrate and the second substrate. The first substrate includes reflective areas and transmission areas that are arranged in an interleaved manner. The surface of the first substrate facing away the second substrate is configured with a metallic reflective layer, which corresponds to the transmission areas. The metallic reflective layer is of the wedge-shaped structure. A surface of the metallic reflective layer facing toward the liquid crystal layer is a plane, and a surface of the metallic reflective layer facing away the liquid crystal layer is a slope. In addition, the thickness of the metallic reflective layer has been gradually increased along a direction from the transmission area toward the reflective area. The metallic reflective layer not only may reflect the ambient lights, but also may control the reflective area to display the images normally. In addition, the metallic reflective layer may reflect the light beams emitted from the backlight source toward the reflective area such that the light beams emit out from the transmission areas. In this way, the light beams emitted from the backlight source may be utilized twice, and the utilization rate and the optical efficiency of the backlight source may be enhanced, which may reduce the power consumption of the LCD.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal panel, comprising:
a TFT substrate and a color film substrate parallel to each other, and a liquid crystal layer between the TFT substrate and the color film substrate, wherein the TFT substrate comprises at least one reflective area and at least one transmission area arranged in an interleaved manner, a surface of the TFT substrate facing away the color film substrate is configured with a metallic reflective layer of a wedged-shaped structure, the metallic reflective layer is arranged on the reflective area, a surface of the metallic reflective layer facing toward the liquid crystal layer is a plane, and a surface of the metallic reflective layer facing away the liquid crystal layer is a slope, a thickness of the metallic reflective layer has been gradually increased along a direction from the transmission area toward the reflective area, the liquid crystal panel further comprises a first polarizer and a second polarizer, the first polarizer arranged on the surface of the TFT substrate facing away the color film substrate, and the second polarizer is arranged on the surface of the color film substrate facing away the TFT substrate.

2. The liquid crystal panel as claimed in claim 1, wherein the first polarizer comprises a hollow area, and location of the hollow area corresponds to the reflective area.

3. The liquid crystal panel as claimed in claim 1, wherein the first polarizer is a TFT polarizer, and the second polarizer is a color film polarizer.

4. The liquid crystal panel as claimed in claim 1, wherein the liquid crystal panel further comprises a common electrode and a pixel electrode, the common electrode is arranged between the liquid crystal layer and the color film substrate, and the pixel electrode is arranged between the liquid crystal layer and the TFT substrate.

5. A liquid crystal panel, comprising:
a first substrate and a second substrate parallel to each other, and a liquid crystal layer between the first substrate and the second substrate, wherein the first substrate comprises at least one reflective area and at least one transmission area arranged in an interleaved manner, a surface of the first substrate facing away the second substrate is configured with a metallic reflective layer of a wedged-shaped structure, the metallic reflective layer is arranged on the reflective area, a surface of the metallic reflective layer facing toward the liquid crystal layer is a plane, and a surface of the metallic reflective layer facing away the liquid crystal layer is a slope, and a thickness of the metallic reflective layer has been gradually increased along a direction from the transmission area toward the reflective area.

6. The liquid crystal panel as claimed in claim 5, wherein the liquid crystal panel further comprises a first polarizer and a second polarizer, the first polarizer arranged on the surface of the first substrate facing away the second substrate, and the second polarizer is arranged on the surface of the second substrate facing away the first substrate.

7. The liquid crystal panel as claimed in claim 6, wherein the first polarizer comprises a hollow area, and location of the hollow area corresponds to the reflective area.

8. The liquid crystal panel as claimed in claim 6, wherein the first polarizer is a TFT polarizer, and the second polarizer is a color film polarizer.

9. The liquid crystal panel as claimed in claim 5, wherein the first substrate is a TFT substrate, and a second substrate is a color film substrate.

10. The liquid crystal panel as claimed in claim 9, wherein the liquid crystal panel further comprises a common electrode and a pixel electrode, the common electrode is arranged between the liquid crystal layer and the color film substrate, and the pixel electrode is arranged between the liquid crystal layer and the TFT substrate.

11. A liquid crystal device (LCD), comprising:
a backlight module comprising a backlight source and a reflective film; and
a liquid crystal panel comprises a first substrate and a second substrate parallel to each other, and a liquid crystal layer between the first substrate and the second substrate, wherein the first substrate comprises at least one reflective area and at least one transmission area arranged in an interleaved manner, a surface of the first substrate facing away the second substrate is configured with a metallic reflective layer of a wedged-shaped structure, the metallic reflective layer is arranged on the reflective area, a surface of the metallic reflective layer facing toward the liquid crystal layer is a plane, and a surface of the metallic reflective layer facing away the liquid crystal layer is a slope, and a thickness of the metallic reflective layer has been gradually increased along a direction from the transmission area toward the reflective area.

12. The LCD as claimed in claim 11, wherein the metallic reflective layer reflects first light beams and second light beams, wherein the first light beams are generated by the light beams emitted from the backlight source and the reflective film, entering the slope of the metallic reflective layer, and reflected by the slope, and the first light beams are reflected by the reflective film and then emit out from the transmission areas, the second light beams are generated by ambient lights entering the plane of the metallic reflective layer via the second substrate and the liquid crystal layer and then are reflected by the slope.

13. The LCD as claimed in claim 12, wherein the liquid crystal panel further comprises a first polarizer and a second polarizer, the first polarizer arranged on the surface of the first substrate facing away the second substrate, and the second polarizer is arranged on the surface of the second substrate facing away the first substrate.

14. The LCD as claimed in claim 13, wherein the first polarizer comprises a hollow area, and location of the hollow area corresponds to the reflective area, the light beams emitted from the backlight source and the reflective film pass through the hollow area, and the first light beams reflected by the metallic reflective layer pass through the hollow area.

* * * * *